US011379444B1

(12) United States Patent
Wang et al.

(10) Patent No.: US 11,379,444 B1
(45) Date of Patent: Jul. 5, 2022

(54) DATA-ANALYSIS-BASED FACILITY FOR ADJUSTING TRACE FIELDS OF A DATABASE TRACE

(71) Applicant: INTERNATIONAL BUSINESS MACHINES CORPORATION, Armonk, NY (US)

(72) Inventors: Xiaobo Wang, Beijing (CN); Shuo Li, Beijing (CN); Leilei Li, San Jose, CA (US); Akiko Hoshikawa, San Jose, CA (US); Sheng Yan Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/160,497

(22) Filed: Jan. 28, 2021

(51) Int. Cl.
*G06F 16/21* (2019.01)
*G06F 16/23* (2019.01)

(52) U.S. Cl.
CPC ........ *G06F 16/217* (2019.01); *G06F 16/2365* (2019.01)

(58) Field of Classification Search
CPC ............................ G06F 16/217; G06F 16/2365
USPC ......................................................... 707/694
See application file for complete search history.

(56) References Cited

U.S. PATENT DOCUMENTS

| | | | | |
|---|---|---|---|---|
| 7,392,510 B1 * | 6/2008 | Treder | ................. | G06F 16/958 709/224 |
| 7,499,944 B2 * | 3/2009 | Higuchi | ................ | G06F 16/283 707/999.102 |
| 8,533,219 B2 * | 9/2013 | Bailey, Jr | ............ | G06F 11/3476 709/224 |
| 8,806,550 B1 * | 8/2014 | Chan | ................... | H04N 21/6168 725/100 |
| 2006/0242288 A1 * | 10/2006 | Masurkar | ............ | G06F 11/0748 345/468 |
| 2009/0240711 A1 * | 9/2009 | Levin | .................... | G06F 16/217 |
| 2012/0109588 A1 * | 5/2012 | Bourgeois | ............... | G06F 30/00 703/1 |

(Continued)

FOREIGN PATENT DOCUMENTS

CN 109063050 A 12/2018

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — James Trujillo
*Assistant Examiner* — Fariborz Khoshnoodi
(74) *Attorney, Agent, or Firm* — Robert Shatto, Esq.; Kevin P. Radigan, Esq.; Heslin Rothenberg Farley & Mesiti P.C.

(57) ABSTRACT

Trace processing in a database system is facilitated by obtaining database trace data collected from database tracing a database system, and data analyzing, by one or more processors, the database trace data to determine one or more field-related rules to, in part, reduce impact on system performance of database tracing in the database system. Trace processing is further facilitated by applying the one or more field-related rules to a database trace in the database system to adjust trace fields of the database trace according to the one or more field-related rules, thereby reducing impact on system performance of the database trace in the database system.

20 Claims, 18 Drawing Sheets

(56) References Cited

U.S. PATENT DOCUMENTS

| | | | |
|---|---|---|---|
| 2013/0232433 A1* | 9/2013 | Krajec | G06F 11/3093 |
| | | | 715/771 |
| 2015/0248452 A1* | 9/2015 | Dillenberger | G06F 16/2343 |
| | | | 707/704 |
| 2017/0039554 A1* | 2/2017 | Greifeneder | G06Q 20/389 |
| 2017/0104658 A1 | 4/2017 | Sykes | |
| 2018/0101466 A1* | 4/2018 | O'Dowd | G06F 17/40 |
| 2019/0095304 A1 | 3/2019 | Kumarasamy et al. | |
| 2019/0354461 A1 | 11/2019 | Krishnamoorthy et al. | |

OTHER PUBLICATIONS

IBM Publication, "z/Architecture Principles of Operation," IBM® Publication No. SA22-7832-12, 13th Edition, Sep. 2019 (pp. Jan. 2000).

Wikipedia, "Pearson Correlation Coefficient", retrieved from https://en.wikipedia.org/wiki/Pearson_correlation_coefficienton Jan. 11, 2021 (19 pages).

Wikipedia, "Association Rule Learning", retrieved from https://en.wikipedia.org/wiki/Association_rule_learning on Jan. 11, 2021 (11 pages).

\* cited by examiner

| FIELD #1 | FIELD #2 | FIELD #3 | ...... | FIELD #n |
|---|---|---|---|---|
| 5.5 | 6.3 | 4.1 | ...... | 2.9 |
| 6.2 | 5.2 | 6.3 | ...... | 4.3 |
| 8.3 | 7.3 | 5.8 | ...... | 4.9 |
| 7.2 | 5.8 | 7.6 | ...... | 7.1 |
| 5.1 | 4.5 | 4.9 | ...... | 3.5 |
| 6.2 | 3.9 | 4.1 | ...... | 2.9 |
| ...... | ...... | ...... | ...... | ...... |
| 5.8 | 7.2 | 6.2 | ...... | 5.3 |

FIG. 7A

|  | FIELD #1 | FIELD #2 | FIELD #3 | ...... | FIELD #n |
|---|---|---|---|---|---|
| FIELD #1 | 1 | 0.932 | 0.645 | ...... | -0.257 |
| FIELD #2 | 0.932 | 1 | -0.145 | ...... | 0.618 |
| FIELD #3 | 0.645 | -0.145 | 1 | ...... | 0.576 |
| ...... | ...... | ...... | ...... | 1 | ...... |
| FIELD #n | -0.257 | 0.618 | 0.576 | ...... | 1 |

FIG. 7B

| SUB-FIELD #1-1 (<25%) | SUB-FIELD #1-1 (<50%) | SUB-FIELD #1-1 (<75%) | SUB-FIELD #1-1 (<100%) | ... | SUB-FIELD #1-n (<25%) | SUB-FIELD #1-n (<50%) | SUB-FIELD #1-n (<75%) | SUB-FIELD #1-n (<100%) | PARENT FIELD #1 |
|---|---|---|---|---|---|---|---|---|---|
| 0 | 1 | 0 | 0 | ... | 1 | 0 | 0 | 0 | 0 |
| 1 | 0 | 0 | 0 | ... | 0 | 1 | 0 | 0 | 1 |
| 0 | 0 | 1 | 1 | ... | 1 | 0 | 0 | 0 | 0 |
| 0 | 0 | 0 | 0 | ... | 0 | 0 | 0 | 1 | 1 |
| ... | ... | ... | ... | ... | ... | ... | ... | ... | ... |
| 0 | 1 | 0 | 0 | ... | 0 | 0 | 1 | 0 | 1 |

SUPPORT($X \rightarrow Y$)
= $P(X, Y) / P(I) = P(X \cup Y) / P(I) = num(X \cup Y) / num(I)$ CONFIDENCE($X \rightarrow Y$)
= $P(Y/X) = P(X, Y) / P(X) = P(X \cup Y) / P(X)$

CORRELATION RULES:

| SUB-FIELD #1-1 (<75%) | FIELD #1 |
|---|---|
| SUB-FIELD #1-1 (<100%) | FIELD #1 |
| SUB-FIELD #1-n (<25%) | FIELD #1 |
| SUB-FIELD #1-n (<50%) | FIELD #1 |

FIG. 8A

DATA-ANALYSIS-BASED FACILITY FOR ADJUSTING TRACE FIELDS OF A DATABASE TRACE

BACKGROUND

One or more aspects relate, in general, to facilitating processing within a computing environment, and in particular, to facilitating processing associated with database systems of the computing environment.

A database system typically includes one or more databases and at least one database management system. A database is an organized collection of data electronically stored and accessed, and a database management system is a mechanism or system used to interact with one or more databases, as well as users and applications that use the one or more databases. The database management system provides various functions to manage the databases including an update function providing insertion, deletion and modification of the data maintained in the databases; retrieval of the data in the databases; administration of the databases including providing data security, data integrity, performance monitoring, including database tracing, etc.; and definition of the organization of the data.

Various database management system trace tools exist for different database systems for troubleshooting database errors and tuning database system performance. The trace tool(s) operates to collect database traces (or trace data) to allow, for instance, tracking of specific actions performed against, or events within, one or more databases of a database system.

SUMMARY

The shortcomings of the prior art are overcome, and additional advantages are provided through the provision of a computer program product for facilitating processing within a computing environment. The computer program product includes one or more computer-readable storage media and program instructions collectively stored on the one or more computer-readable storage media, where the program instructions are executable by one or more processors to cause the one or more processors to perform a method. The method includes obtaining database trace data collected from database tracing, at least in part, a database system of the computing environment, and data analyzing, by the one or more processors, the database trace data, and determining therefrom one or more field-related rules to, in part, reduce impact on system performance of database tracing in the database system. The method further includes applying, by the one or more processors, the one or more field-related rules to a database trace in the database system to adjust trace fields of the database trace according to the one or more field-related rules, thereby reducing impact on system performance of the database trace in the database system.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7A depicts one embodiment of a performance indicator field table containing example field values obtained from a repeating database trace of a database system, in accordance with one or more aspects of the present invention;

FIG. 7B illustrates one embodiment of a determined correlation matrix table with correlation dependencies between trace fields of the database trace, in accordance with one or more aspects of the present invention;

FIG. 8A depicts one embodiment of data-analysis-based determining of one or more association rules between a trace field of a database trace, and one or more sub-fields of that trace field, in accordance with one or more aspects of the present invention;

DETAILED DESCRIPTION

Figure 1A:
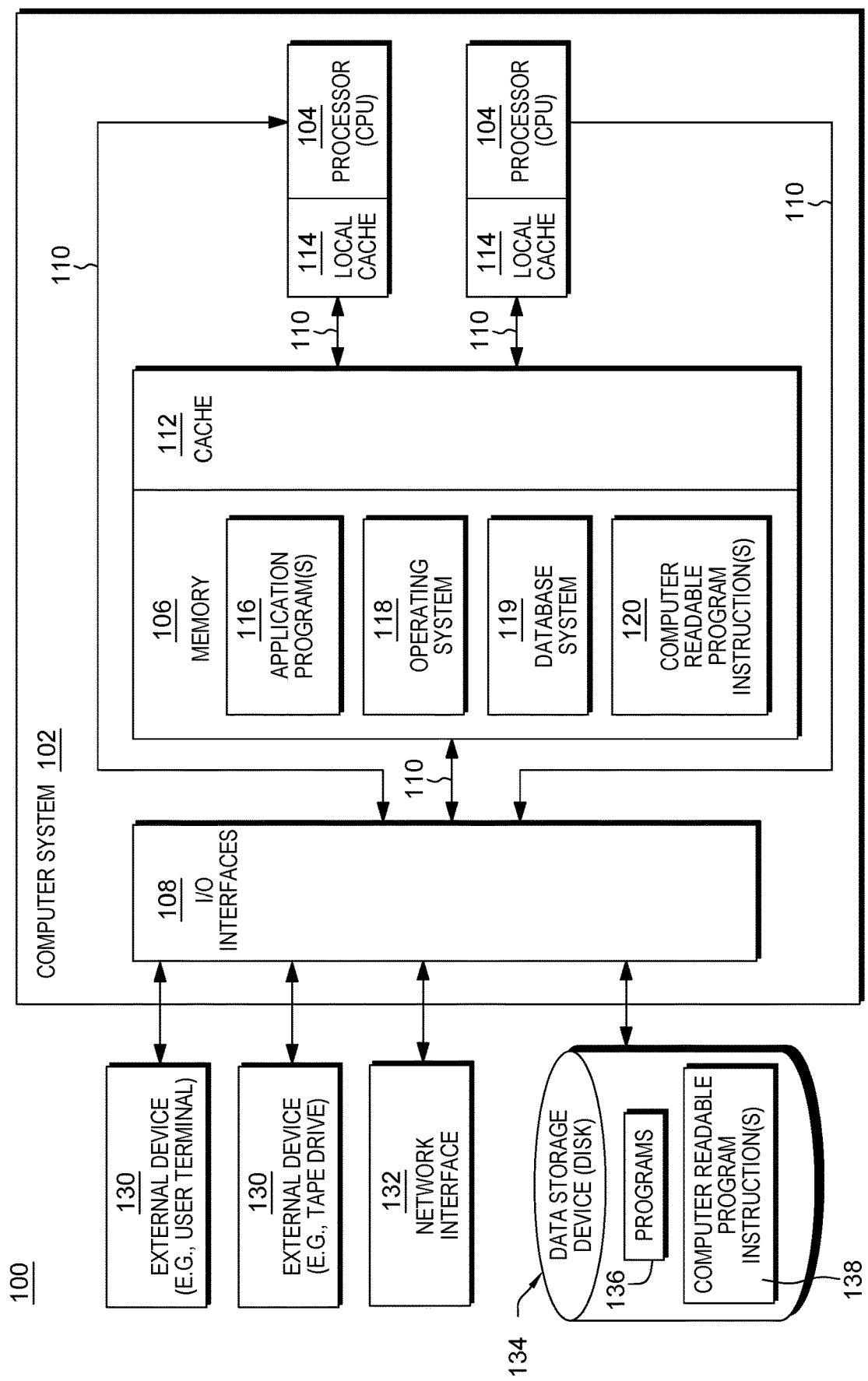
FIG. 1A depicts one embodiment of a computing environment to incorporate and use one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, processing techniques and tools, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 1A as computer-readable program instructions 120, as well as application programs 116 and database system code 119, one or more of which can be stored in memory 106 of computer system 102. Further examples include programs 136 and computer-readable program instruction(s) 138 in data storage device 134 of FIG. 1A.

A database system can include one or more databases and at least one database management system. The database management system typically includes a suite of log systems, or trace systems or tools to trace data and events in different trace fields and granularities within the database(s). Database management systems can provide trace data or reports at a variety of levels. For instance, the DB2® relational database management system, offered by International Business Machines Corporation of Armonk, N.Y. (USA), provides different levels of trace, including a statistics trace, an accounting trace, an audit trace, a performance trace, and a monitor trace. (DB2® is a trademark or registered trademark of International business Machines Corporation in one or more jurisdictions.) A statistics trace reports information about how much the database system services are used, and an accounting trace records transaction-level data that is written when processing for a transaction is completed. It provides data that enables database system capacity planning, and tuning of application programs. An audit trace collects information about the database system security controls, and can be used to ensure that data access is allowed only for authorized purposes. A performance trace is designed for performance analysis and tuning of the database system. This trace includes records of specific events in the system, including events related to distributed data processing. The data can be used for program, resource, user, and system-related tuning. The monitor trace enables attached monitor programs to access the database system trace data through calls to the instrumentation facility interface. Monitor programs can access the trace data asynchronously, or synchronously, in certain applications.

The volume of data that database traces collect can be quite large. Consequently, the number of trace records that a user requests can potentially impact system performance. Thus, although database traces can assist with system performance-issue diagnosis, the trace collection process itself can negatively impact system performance by occupying system resources (such as one or more processors, one or more input/output devices, etc.) during the database trace collection process. As a result, for operational performance reasons, an enterprise database system is typically not directed to open and trace every type of database log in every detailed manner. Thus, when a user encounters a database error issue, or performance issue, the user usually cannot obtain the desired background trace data in real time. In practice, certain problems are hard to reproduce, and although they can be reproduced, experienced administrators are often required in order to perform multiple debugging and layering operations of different granularity and scope to gradually open the logs to a desired trace level. Addressing this issue, disclosed herein are data-analysis-based facilities for use in association with database trace processing that result in more accurately and effectively providing real-time database trace data for managing, maintaining and diagnosing database system operation for (for instance) optimized database maintenance.

Advantageously, disclosed herein are computer program products, computer systems and computer-implemented methods to facilitate trace processing in a database system by, for instance, reducing impact on system performance during database trace collection, as well as to facilitate autonomous self-diagnosing of a database system, and provide computer-implemented, qualifying of trace fields in a database trace, including cognitively eliminating and/or adding of trace fields to the database trace of a database system.

More particularly, embodiments of the present invention include a computer-implemented method, a computer system and computer program product for facilitating trace processing in a database system, where program code executing on one or more processors obtains database trace data collected from database tracing, at least in part, the database system of the computing environment, and data analyzes the database trace data, determining based on the data analyzing, one or more field-related rules to, in part, reduce impact on system performance of the database tracing in the database system. Further, the facilitating trace processing includes applying, by the one or more processors, the one or more field-related rules to a database trace of the database system to adjust trace fields in the database trace according to the one or more field-related rules, thereby reducing impact on system performance of the database trace in the database system.

In one or more embodiments of the present invention, program code executing on one or more processors adjusts trace fields of the database trace pursuant to the one or more field-related rules by eliminating one or more trace fields of the database trace in the database system based on the one or more field-related rules and/or by adding one or more trace fields to the database trace in the database system based on the one or more field-related rules.

In certain embodiments of the present invention, program code executing on one or more processors generates performance threshold curves against the trace fields defined in the obtained database trace data, and based, at least in part, on the performance threshold curves, determines at least one field-related rule of the one or more field-related rules. In certain embodiments, the determining includes determining respective normal distribution ranges for the trace fields from the obtained database trace data, such as from the generated performance threshold curves, and determining the at least one field-related rule is relative to the determined, respective normal distribution ranges.

In one or more embodiments of the present invention, program code executing on one or more processors determines correlation dependencies between trace fields of the obtained database trace data, and based, at least in part, on the correlation dependencies between trace fields, determines at least one field-related rule of the one or more field-related rules. In one embodiment, adjusting trace fields of the trace data pursuant to the one or more field-related rules includes eliminating, by the one or more processors, one or more trace fields of the database trace in the database system based on the determined correlation dependencies between trace fields of the obtained database trace data.

In one or more embodiments of the present invention, program code executing on one or more processors further determines at least one association rule between a trace field of the obtained database trace data, and one or more sub-fields of that trace field, the at least one association rule being at least one field-related rule of the one or more field-related rules. In certain embodiments, adjusting trace fields of the database trace pursuant to the one or more field-related rules includes at least one of eliminating at least one trace field or trace sub-field of the database trace, or adding at least one trace field or trace sub-field to the database trace in the database system based on the determined at least one association rule.

In one or more embodiments, program code executing on one or more processors sorts collected trace data collected from the database trace in the database system, where the sorting is to locate one or more transactions and/or associated structure query languages (SQLs) potentially causing a database system performance issue, such as one or more transactions taking the longest to complete.

Embodiments of the present are inextricably tied to computing and provide significantly more than existing approaches to performing database tracing in a database system. For instance, embodiments of the present invention provide program code executing on one or more processors to exploit the interconnectivity of various systems, as well as to utilize various computing-centric data analysis and handling techniques, in order to obtain database trace data collected from database tracing, at least in part, a database system of a computing environment, and to analyze the database trace data, and determine therefrom, one or more field-related rules to, in part, reduce impact on system performance of database tracing in the database system, and to apply the one or more field-related rules to a database trace in the database system to adjust trace fields of the database trace according to the one or more field-related rules, and thereby reduce impact on system performance of the database trace in the database system.

Both the interconnectivity of the computing systems utilized, and the computer-exclusive data processing techniques utilized by the program code, enable various aspects of the present invention. Further, embodiments of the present invention provide significantly more functionality than existing approaches to trace processing within a database system by advantageously dynamically customizing trace fields for a database trace to, in part, reduce performance impact of the database trace on the database system, as well as to tailor the database trace to facilitate more efficiently identify transactions and/or structure query languages (SQLs) potentially causing a database system performance issue.

In embodiments of the present invention, program code provides significantly more functionality, including but not limited to: 1) program code that obtains database trace data collected from database tracing, at least in part, a database system of a computing environment; 2) program code that data analyzes the database trace data, and determines from the data analyzing, one or more field-related rules to, at least in part, reduce impact on system performance of database tracing in the database system; and 3) program code to apply the one or more field-related rules to a database trace in the database system to adjust trace fields of the database trace according to the one or more field-related rules, and thereby reduce impact on system performance of the database trace in the database system.

One or more aspects of the present invention are performed by a database system included within a computing environment, an example of which is depicted in FIG. 1A. As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 can include, for instance, a cache 112, such as a shared cache, which may be coupled to local caches 114 of processors 104. Further, memory 106 may include one or more programs or applications 116, an operating system 118, a database system 119, and one or more computer readable program instructions 120. Computer readable program instructions 120 may be configured to carry out functions of embodiments of aspects of the invention.

Computer system 102 can also communicate via, e.g., I/O interfaces 108 with one or more external devices 130 and a network interface 132. External devices 130 include, for example, a user terminal, a tape drive, a pointing device, a display, etc., as well as one or more data storage devices 134 (e.g., storage, such as disk, etc.). Data storage device 134 can store one or more programs 136, one or more computer readable program instructions 138, and/or data (e.g., modified pages written to storage, log data written to storage, etc.), etc. The computer readable program instructions can be configured to carry out functions of embodiments of aspects of the invention.

Network interface 132 enables computer system 102 to communicate with one or more networks, such as a local area network (LAN), a general wide area network (WAN), and/or a public network (e.g., the Internet), providing communication with other computing devices or systems.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disc drive for reading from and writing to a removable, non-volatile magnetic disc (e.g., a "floppy disc"), and/or an optical disc drive for reading from or writing to a removable, non-removable optical disc, such as a CD-ROM, DVD-ROM, or other optical media. It should be understood that other hardware and/or software components could be used in conjunction with computer system 102. Examples include, but are not limited to: microcode, device drivers, redundant processing units, external disc drive arrays, raid systems, tape drives, and data archival storage systems, etc.

Computer system 102 can be operational when numerous other general-purpose or special-purpose computing system environments or configurations. Examples of well-known computing systems, environments, and/or configurations that can be suitable for use with computer system 102 include, but are not limited to, personal computer (PC) systems, server computer systems, thin clients, thick clients, handheld or laptop devices, multiprocessor systems, microprocessor-based systems, network systems, network PCs, mini-computer systems, mainframe computer systems, and distributed cloud computing environments that include any of the above systems or devices, and the like.

In one example, database system 119 includes one or more components to perform one or more aspects of the present invention. These components can be stored in memory, including main memory (e.g., memory 106) and/or one or more caches (e.g., shared cache 112, local cache 114), and/or external storage (e.g., device 134), and can be executed by one or more processors (e.g., processor 104).

Figure 1B:
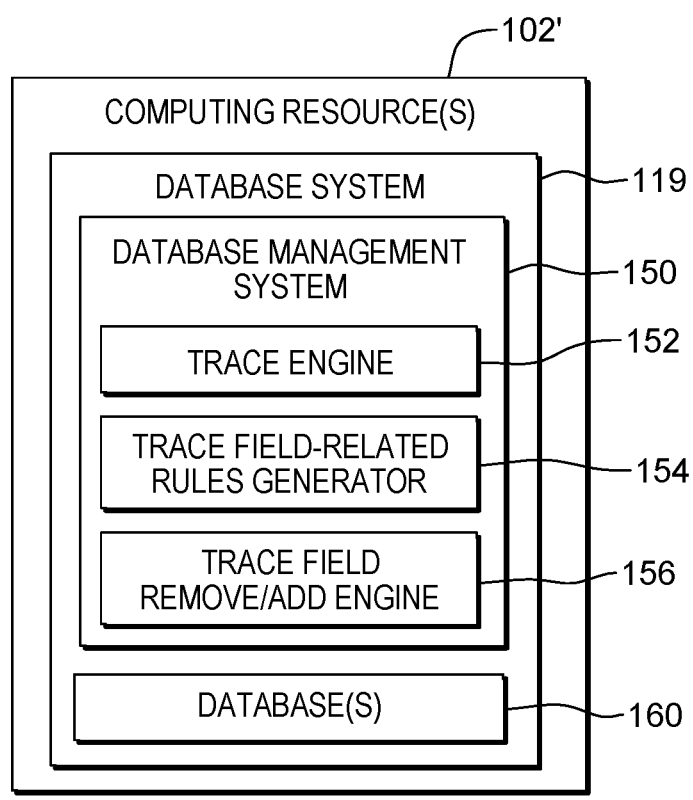
FIG. 1B depicts further details of one embodiment of a computing environment to incorporate and use one or more aspects of the present invention.

FIG. 1B depicts a further embodiment of a technical environment or system into which various aspects of some embodiments of the present invention can be implemented. By way of example, one or more computing resources 102' can be provided or used, including one or more computer systems, such as computer system 102 depicted in FIG. 1A, and described above. In the embodiment illustrated, computing resource(s) 102' includes a database system 119, which includes at least one database management system 150, and one or more databases 160. As illustrated, database management system(s) 150 can include, in one or more embodiments, a trace engine 152, such as a suite of log systems, or trace systems or tools to trace data and events in different trace fields and granularities within database(s) 160. In addition, database management system 150 includes a data-analysis-based facility in accordance with inventive aspects disclosed herein, including a trace field-related rules generator 154, and a trace field remove/add engine 156. Trace field-related rules generator 154 includes program code to execute on one or more processors to define one or more field-related rules from obtained database trace data collected from database tracing the database system, such as explained herein. Trace field remove/add engine 156 includes program code to execute on one or more processors to apply the one or more field-related rules to a database trace in the database system to adjust trace fields of the database trace according to the one or more field-related rules, and thereby reduce impact on system performance of the database trace in the database system, and in one or more embodiments, facilitate evaluation of one or more performance-related issues in the database system.

As noted, database tracing can be helpful for diagnosing system performance issues within a database system. However, the process of collecting a database trace can impact system performance, since system resources are used to affect the database trace collection. In one or more embodiments, database tracing can include repeating the database trace at set time intervals for a period of days, weeks, months, etc. Further, in certain embodiments, system performance can degrade when greater database trace detail is gathered. Also, when greater detailed traces are gathered, greater system storage is required to store the trace data. Furthermore, timing on when to start trace collection can be an issue in certain implementations. Too early or late in starting the database trace can affect system performance or miss identifying useful information during the database trace. Processing is disclosed herein to address these issues by obtaining database trace data collected from database tracing a database system of the computer environment, and data analyzing that trace data to determine therefrom one or more field-related rules to, in part, reduce impact on system performance of continued database tracing in the database system, and to apply the one or more field-related rules to the database trace in the database system to adjust trace fields of the database trace according to the one or more filed-related rules.

Figure 2A:
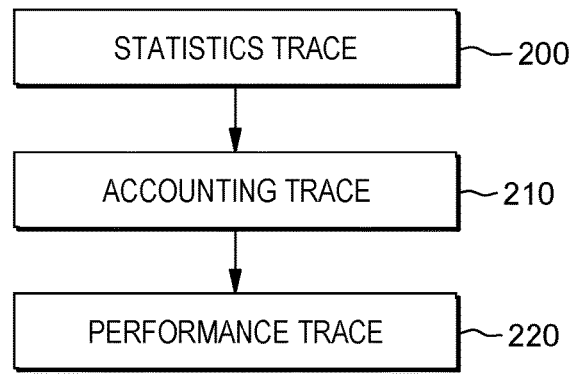
FIG. 2A depicts one embodiment of a trace hierarchy starting with a subsystem level in a database system.

FIG. 2A illustrates one embodiment of a database trace hierarchy, beginning at a subsystem level (or statistics level), where a statistics trace 200 is obtained to, for instance, report information about database system services usage. In one embodiment, the statistics trace can contain multiple fields, such as structure query language (SQL) usage, CPU times, stored procedure, triggers, query parallelism, log activity, locking activity, buffer pool activity, storage statistics, etc. An accounting trace 210 is used to record transaction-level data that is written when processing for a transaction is completed. The statistics trace occurs at the subsystem level, while the accounting trace occurs at the thread level, where each transaction is assumed, in one embodiment, to run on a respective thread of a multi-threaded computing environment. The performance trace 220 includes program code executing one or more processors that analyzes system performance and facilitates tuning of the database system. In particular, the performance trace facilitates evaluating individual steps or operations of processing within the database system. The database trace collection frequency can vary. For instance, in one embodiment, trace data can be captured approximately every n minutes for a period of time during database system operation. Depending on a database performance issue encountered, the appropriate statistics trace data, accounting trace data, performance trace data, etc., can then be opened or evaluated to facilitate diagnosing the issue.

Figure 2B:
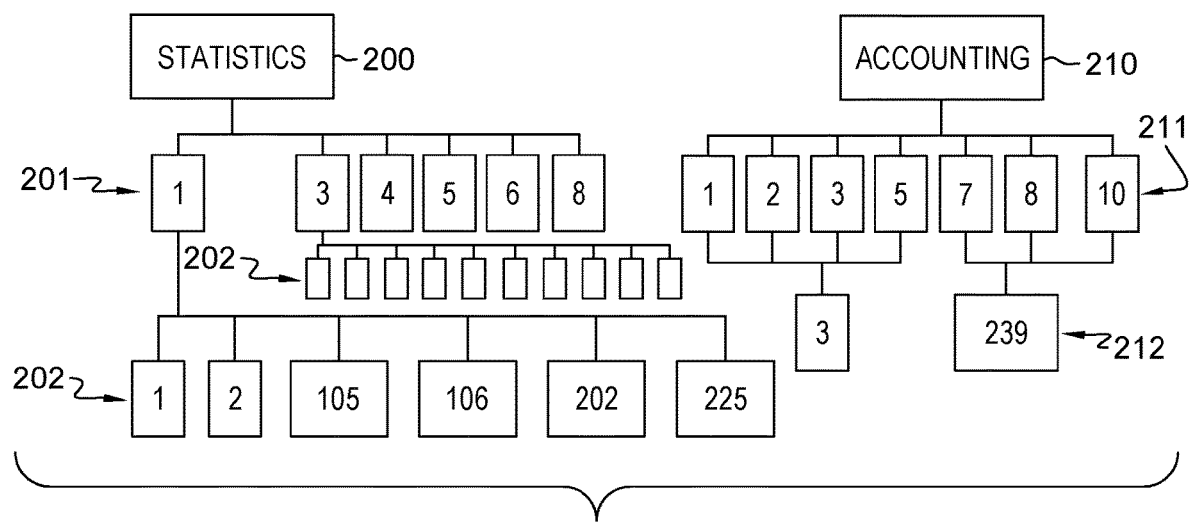
FIG. 2B depicts embodiments of database trace hierarchies including a trace type, a trace class, and performance indicator identifiers for a statistics trace and an accounting trace.

FIG. 2B depicts a further example of database trace hierarchy, where the type of trace can include, for instance, a statistics trace 200, an accounting trace 210, performance trace, audit trace, etc., and each type of trace can include different trace classes 201, 211, which are respective clusters or sets of performance fields, also referred to herein as trace fields or primary fields. One or more of the trace fields can include respective or shared performance indicator IDs 202, 212, which are specific performance-related sub-fields to the respective trace fields. By way of example only, a trace field might be, for instance, "database suspension time" and relevant sub-fields might include "total lock times", "total latch times", and "synchronous I/O time".

Figure 3A:
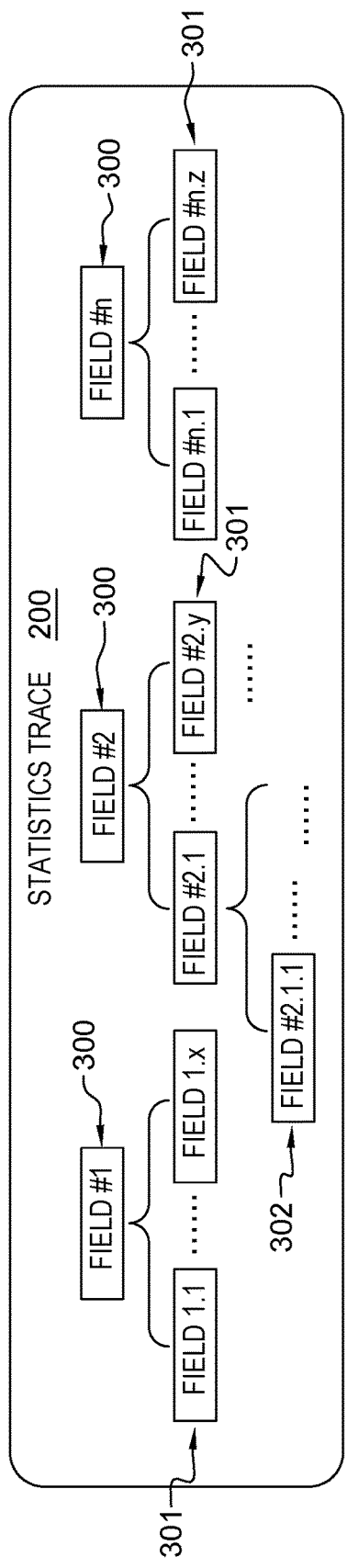
FIG. 3A depicts a further embodiment of a statistics trace hierarchy in a database system, illustrating multiple trace fields and respective trace sub-fields.

FIG. 3A depicts one embodiment of a statistics trace 200. As illustrated, the statistics trace includes collecting trace data for multiple fields 300 (FIELD #1, FIELD #2 FIELD #n), with the different fields 300 being illustrated as including multiple sub-fields 301 (e.g., FIELD 1.1 . . . FIELD 1.x for FIELD #1), with one or more of the sub-fields 301 including one or more further sub-fields 302 (e.g., FIELD #2.1.1 from FIELD #2.1 of FIELD #2), by way of example only.

Figure 3B:
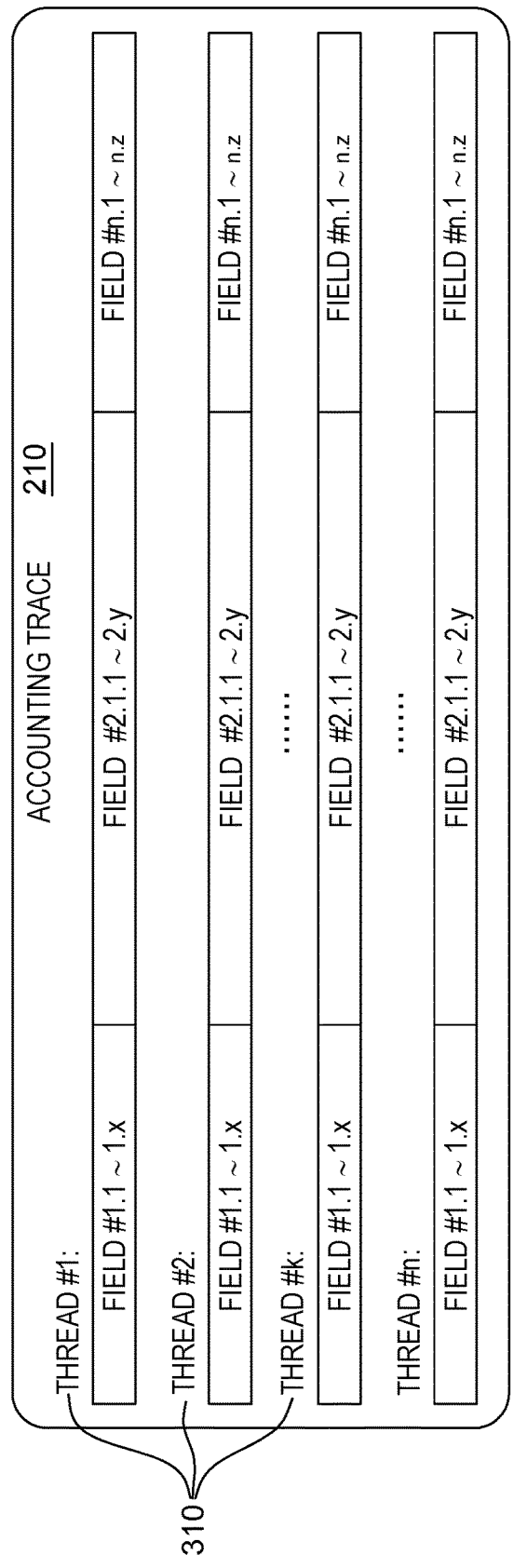
FIG. 3B depicts a further embodiment of an accounting trace in a database system, illustrating field and sub-field data for respective threads running in the database system.

In FIG. 3B, an accounting trace 210 example is illustrated where different threads 310 (e.g., THREAD #1, THREAD #2 . . . THREAD #k . . . THREAD #n) are illustrated. In the accounting trace, statistics trace data for the respective threads of the multi-threaded computing environment is accumulated by, for instance, adding or collecting the respective values obtained from the statistics trace collection.

As understood by one of ordinary skill in the art, the amount of trace data generated from periodically performing one or more statistics trace and/or accounting trace collections, such as depicted in FIGS. 3A & 3B, can be quite large across the database system, with the resultant trace data including a large amount of data potentially not particularly relevant to identifying or addressing a particular database system issue. Disclosed herein are techniques for tailoring or qualifying a database trace, and more particularly, the trace fields of a database trace to, for instance, more intelligently collect trace data within a database system, and thereby reduce impact on system performance of database tracing in the database system.

FIGS. 4A-4D depict one embodiment of data-analysis-based processing to be implemented by program code executing on one or more processors for facilitating trace processing, in accordance with one or more aspects disclosed herein.

Figure 4A:
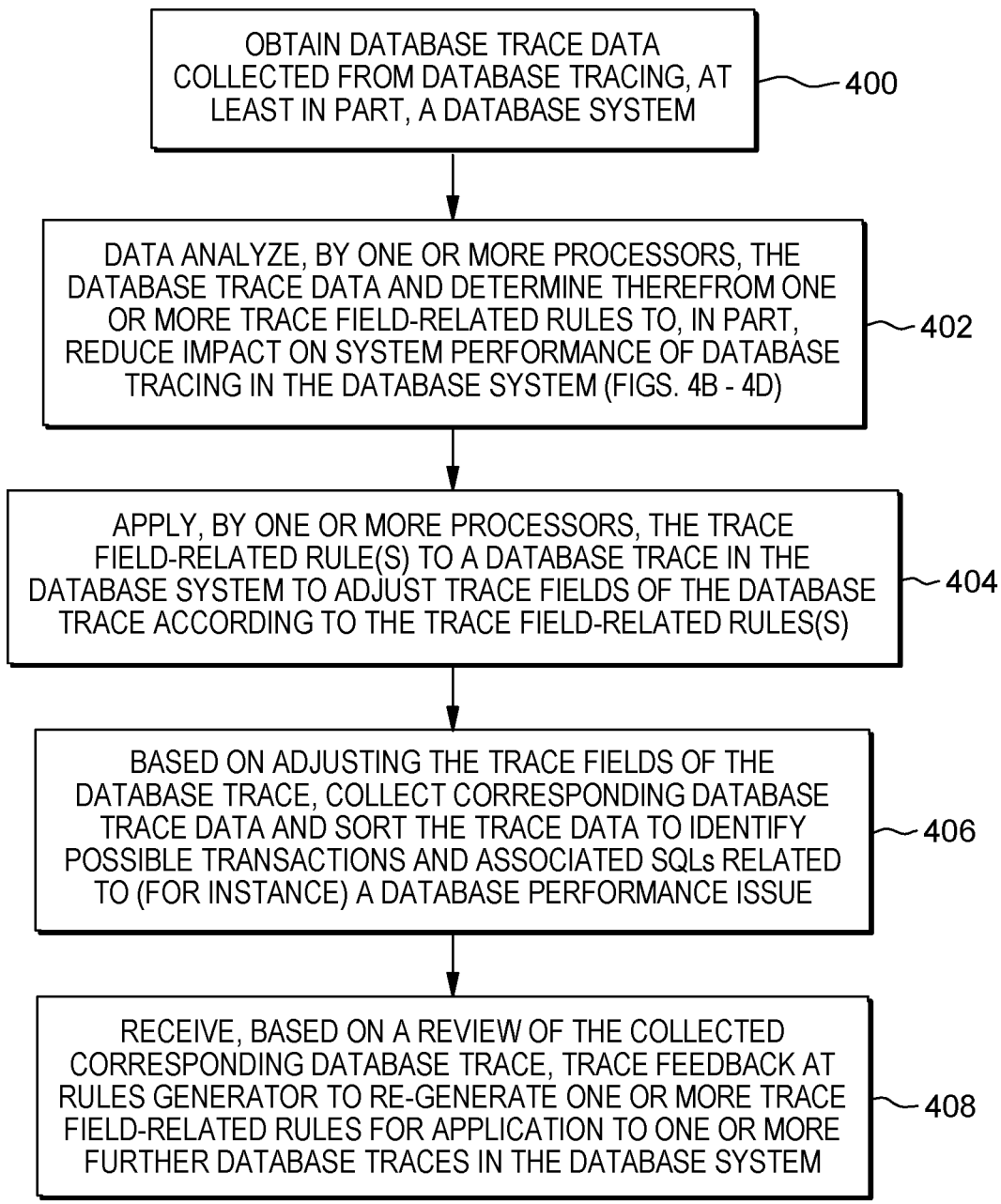
FIGS. 4A-4D depict one embodiment of a process to facilitate database tracing in a database system, in accordance with one or more aspects of the present invention.

In particular, FIG. 4A depicts one high-level embodiment of a workflow or process illustrating one or more aspects of some embodiments of the present invention. As illustrated, in one or more embodiments, program code executing on one or more processors obtains (e.g., receives or identifies) database trace data collected from database tracing, at least in part, a database system 400. For instance, the database trace data can be historical or prior-collected database trace data from database tracing, at least in part, the database system 400 over time, either in a training environment, or in an actual operational environment. As illustrated, program code is provided to data analyze the database trace data, and determine therefrom one or more trace field-related rules to, in part, reduce impact on system performance of database tracing in the database system 402. Process embodiments for generating one or more field-related rules are described further below with reference to FIGS. 4B-4D.

Once generated, the trace field-related rules are applied, by the one or more processors, to a database trace in the database system to adjust the trace fields of the database trace according to the trace field-related rules 404. Based on adjusting the trace fields of the database trace, the corresponding database trace is performed, and trace data is collected 406. Program code executing on the one or more processors can also be provided to sort the trace data to identify or highlight possible transactions and (optionally) associated structure query languages (SQLs) related to, for instance, a database performance issue 406.

Depending on the implementation, the resultant collected and sorted trace data can be provided to, for instance, a database administrator (or, for instance, a cognitive system implementing machine learning) for evaluation 408. The administrator (or cognitive system) evaluates the collected database trace data and provides trace feedback to the rules generator of the data-analysis-based facility to, for instance, regenerate one or more trace field-related rules for application to future database traces in the database system 408.

Figure 5:
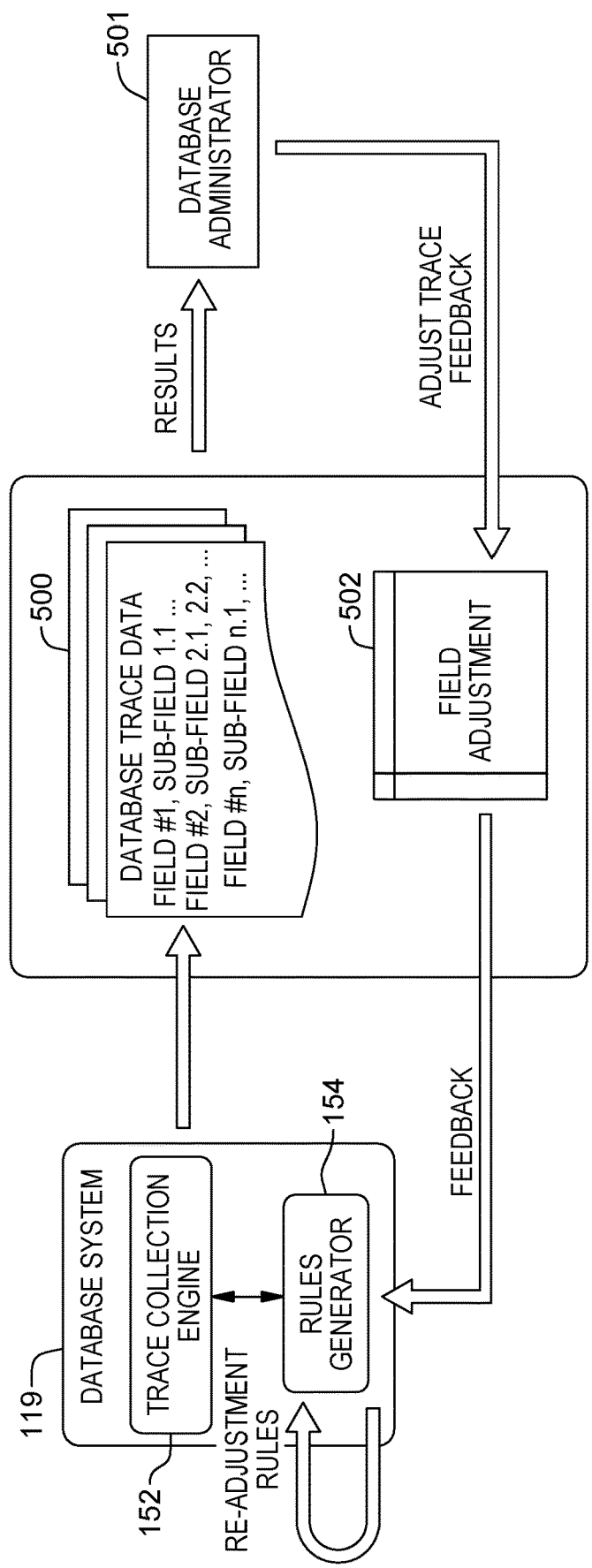
FIG. 5 depicts one embodiment of database trace processing, with feedback being provided to a rules generator to adjust one or more field-related rules for qualifying database trace processing, in accordance with one or more aspects of the present invention.

FIG. 5 illustrates one embodiment of the trace-related processing of FIG. 4A. As noted, in one embodiment, database system 119 includes a trace collection agent or engine 152 which includes program code that, when executed, collects database trace data 500, such as statistics and accounting trace data, which can be sorted by the program code to identify possible transactions and associated SQLs. For instance, in one embodiment, the sorting can be to identify transactions requiring the longest time to complete. These transactions can be identified by the code as the top n transactions for evaluation, along with their respective top SQLs. The results can be provided to a database administrator 501 (or optionally, a cognitive agent). The database administrator reviews the results and, in one or more embodiments, provides field adjustment feedback 502 which is provided to rules generator 154 of the data-analysis-based facility. For instance, in one or more embodiments, the feedback provided by the database administrator is used by program code to regenerate or adjust one or more field-related rules to be applied to further database tracing in the database system. In one or more embodiments, the feedback can include, for instance, identifying a missing performance field desired for evaluation, or a value to adjust one or more rules related to or derived from correlation dependency and/or association rules. In this manner, the trace field-related rules can be continuously adjusted to improve the trace processing policies. For instance, based on feedback, one or more parameters within formulas used to derive one or more field-related rules can be adjusted automatically.

Figure 4B:
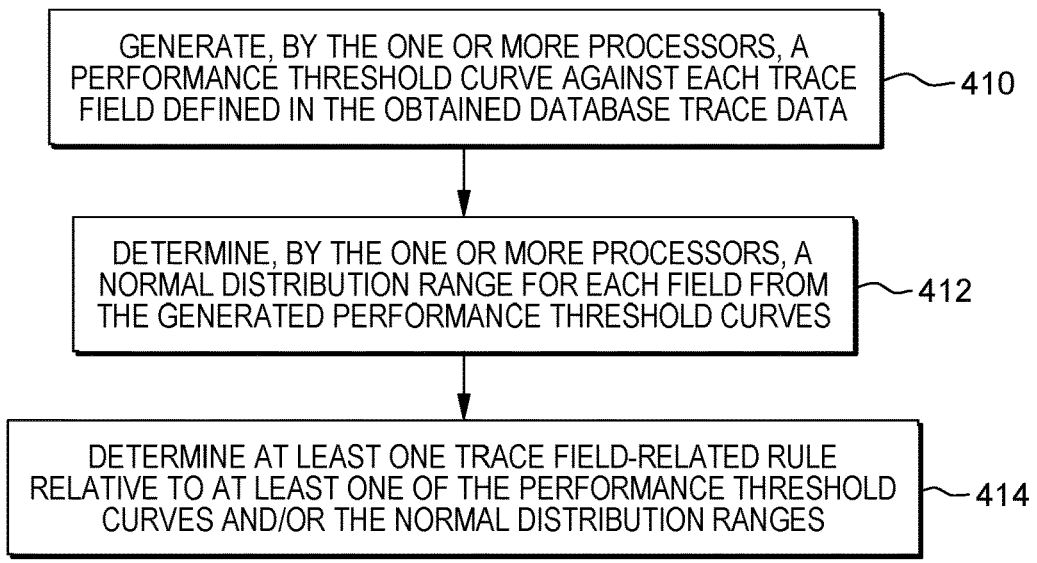
Figure 6A:
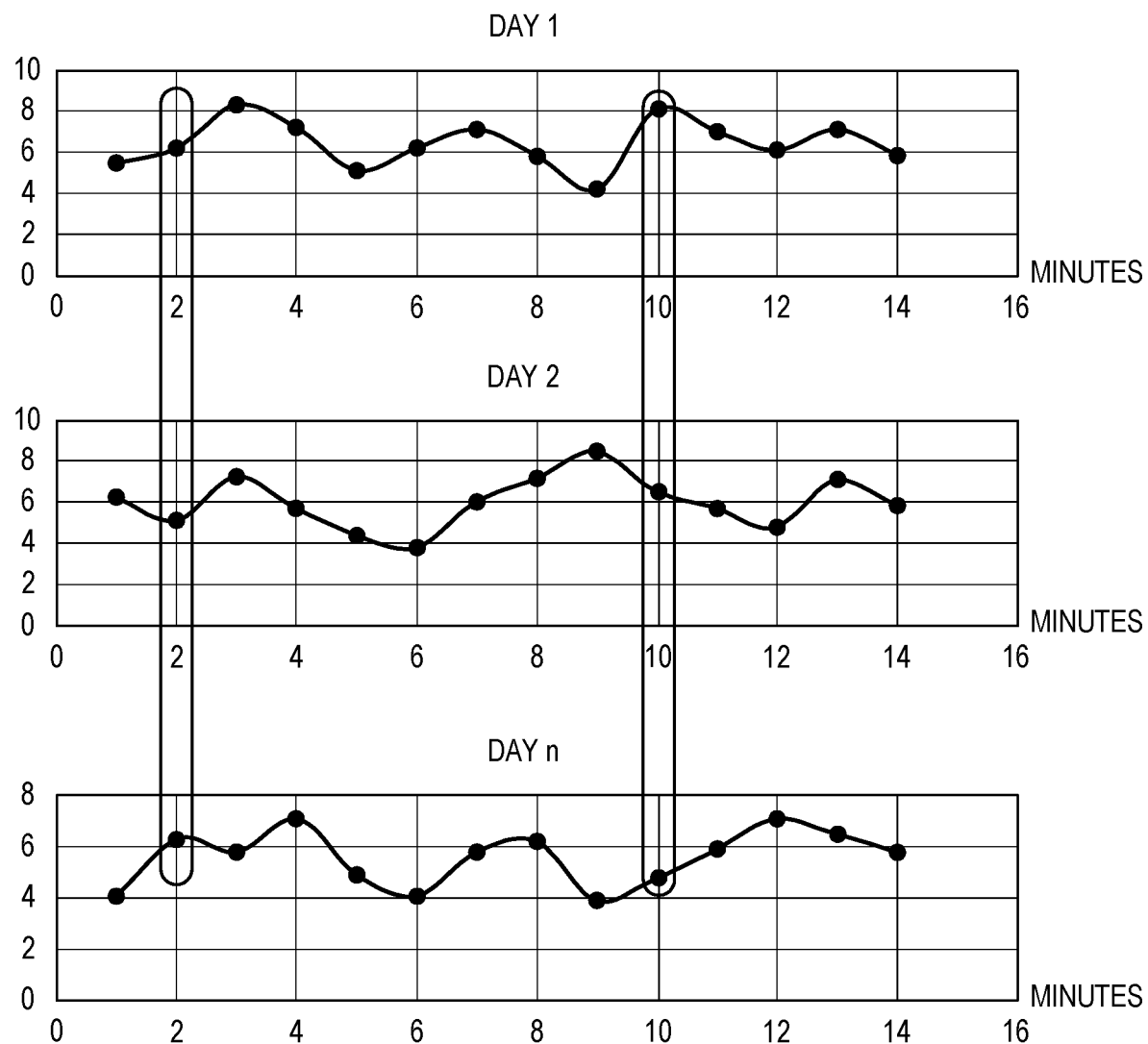
FIG. 6A illustrates one embodiment of example performance threshold curves obtained for a trace field of a repeating database trace, in accordance with one or more aspects of the present invention.

FIG. 4B depicts one embodiment of a data-analysis-based facility for determining from obtained database trace data one or more trace field-related rules. In the approach of FIG. 4B, program code generates a performance threshold curve against one or more trace fields defined in the obtained database trace data, with the database trace being repeated at a defined time interval in this example, for instance, every minute, for a number of days 410. An embodiment of this process is depicted in FIG. 6A, where performance threshold curves are illustrated for a trace field of a database trace repeated every minute over a number of days.

Figure 6B:
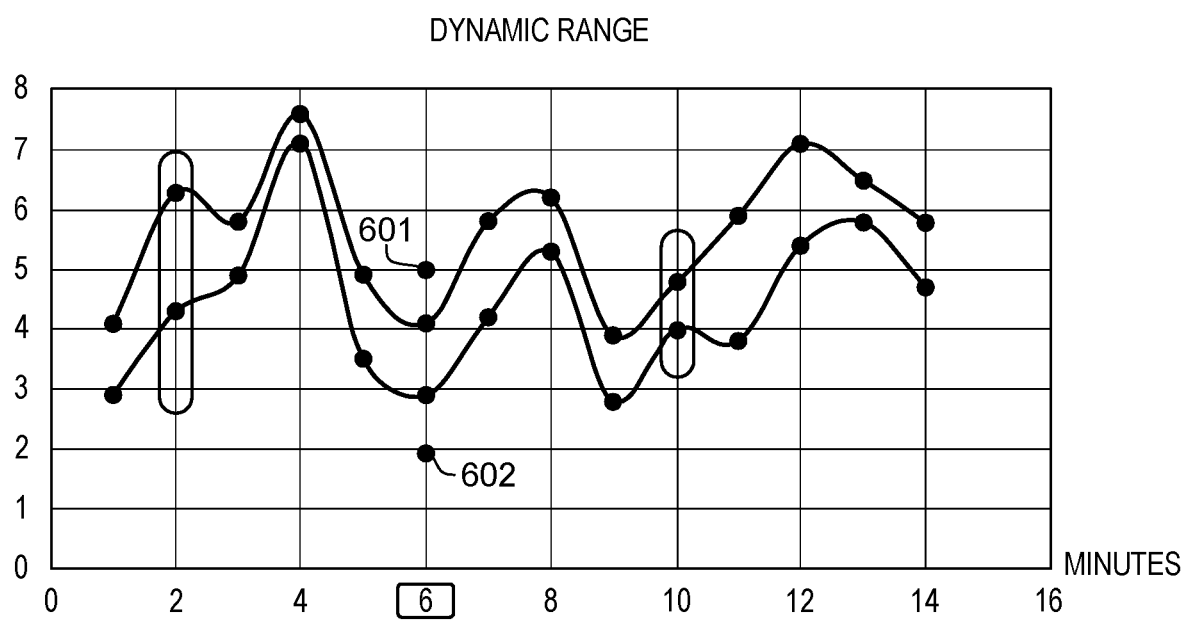
FIG. 6B graphically depicts one embodiment of a field value range determined based on, for instance, the performance threshold curves of FIG. 6A, in accordance with one or more aspects of the present invention.

In one or more embodiments, the data-analysis-based facility determines a normal distribution range for each field from the generated performance threshold curves 412 (FIG. 4B). FIG. 6B depicts one example of a distribution range of a performance field or trace field in the database trace, with a corresponding normal distribution range of generated threshold curves being determined (in one embodiment) for each trace field of the database trace. For instance, assuming a normal distribution, where μ is the average trace value, a valid or normal trace value can be defined as μ+3σ. The data-analysis-based facility can determine at least one trace field-related rule relative to at least one of the performance threshold curves and/or normal distribution ranges 414 (FIG. 4B). For instance, in one embodiment, a field-related rule would be to consider the trace value abnormal where the trace value is outside the determined normal distribution range for the trace field. In FIG. 6B, values 601, 602 are shown outside of the upper and lower dynamic distribution range, respectively, determined by the data-analysis-based facility.

Figure 6C:
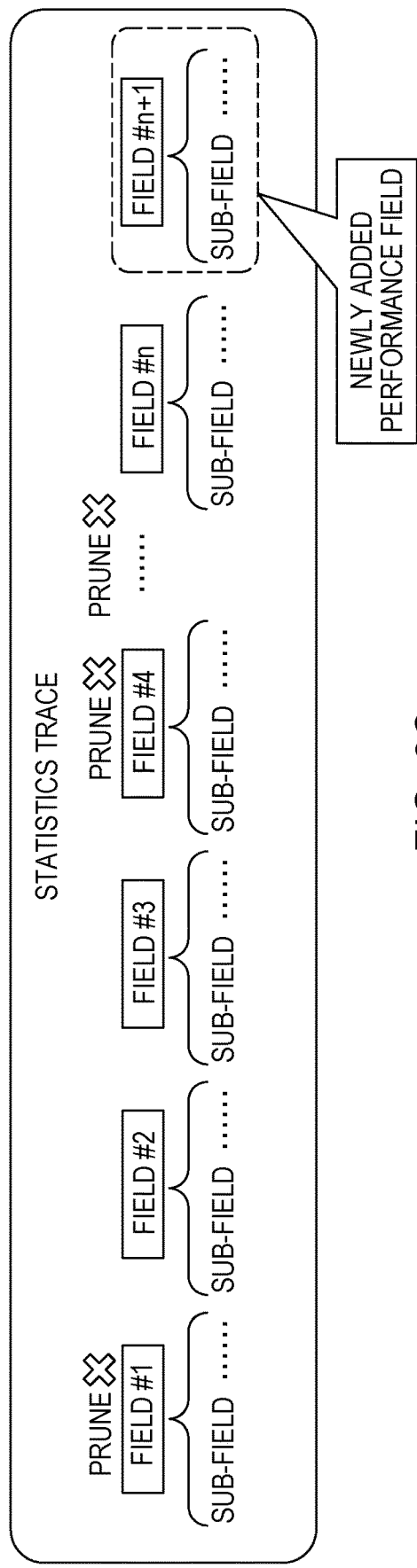
FIG. 6C depicts one embodiment of a data-analysis-based facility adjusting of trace fields of a statistics trace based on respective performance threshold curves, such as depicted in FIG. 6A, and/or respective field value ranges, such as depicted in FIG. 6B, in accordance with one or more aspects of the present invention.

FIG. 6C illustrates one example of application of field-related rules ascertained by a data-analysis-based facility such as depicted in FIG. 4B. In this embodiment, FIELD #1, and FIELD #4 are pruned or eliminated from the database trace, since the trace values for these fields are determined to be within the generated normal distribution range for those fields. Further, program code automatically adds one or more fields, such as FIELD #n+1 to the database trace since the program code determines that the trace value for FIELD #n+1 is outside of the corresponding normal distribution range for that field, and therefore, a performance issue of interest may be impacting and/or related to that field. In this manner, the data-analysis-based facility cognitively or intelligently modifies the trace fields in the database trace in order to, for instance, reduce impact on system performance of database tracing in the database system by removing fields with normal trace data values. Further, the facility can cognitively modify the database trace by adding one or more fields with abnormal trace data values, thereby facilitating analysis of a database-related issue using the resultant database trace data. Note that this processing is at the field level of the database trace.

Figure 4C:
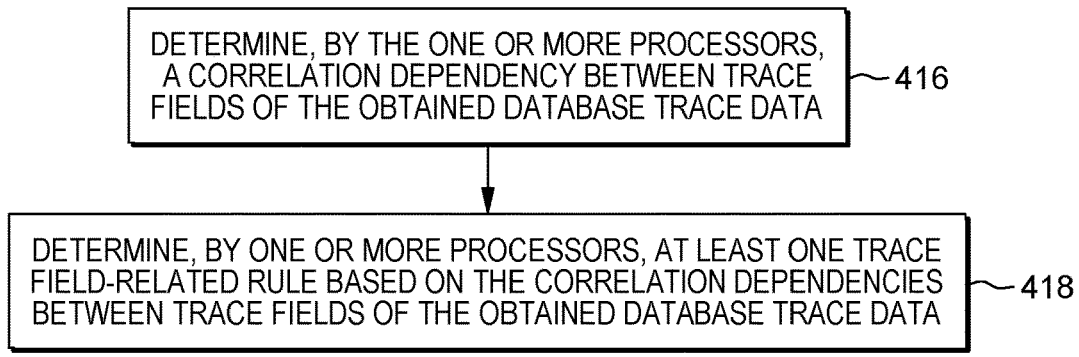

FIG. 4C depicts another embodiment of data-analysis-based facility processing, in accordance with one or more aspects of the present invention. In FIG. 4C, the facility program code is depicted to include program code which executes on one or more processors to determine, by the one or more processors, a correlation dependency between trace fields of the obtained database trace data 416, and to determine, by the one or more processors, at least one trace field-related rule based on the correlation dependencies between the trace fields of the obtained database trace data 418.

Figure 7C:
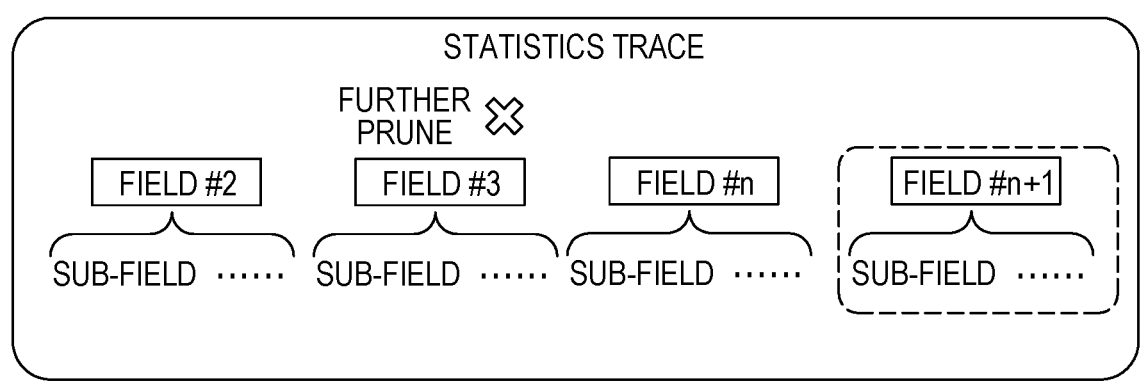
FIG. 7C depicts one embodiment of a data-analysis-based further adjusting of trace fields of the statistics trace according to determined correlation dependencies, including eliminating one or more trace fields from the database trace and/or adding one or more trace fields to the database trace, in accordance with one or more aspects of the present invention.

By way of example, FIG. 7A depicts one embodiment of a performance indicator field data structure with field values ascertained, for instance, by database tracing in a database system. FIG. 7B illustrates one embodiment of determined correlation dependencies between trace fields of the database trace. As illustrated in FIG. 7B, there is determined in this example to be a strong correlation dependency between FIELD #2 and FIELD #3, and as such, in FIG. 7C, the data-analysis-based facility selects FIELD #3 for pruning or eliminating from the database trace.

In one or more implementations, determining the correlation dependencies can include ascertaining a Pearson's correlation coefficient, such as by using Equation (1).

$$\rho_{X,Y} = \frac{\text{cov}(X, Y)}{\sigma_X \sigma_Y} = \frac{E[(X - \mu_X)(Y - \mu_Y)]}{\sigma_X \sigma_Y} \quad (1)$$

where:
ρ=population correlation coefficient;
X,Y=random variables
cov=the covariance;
$\sigma_X$=the standard deviation of X;
$\sigma_Y$=the standard deviation of Y;
$\mu_X$=the mean of X;
$\mu_Y$=the mean of Y; and
E=the expectation.

The Pearson correlation coefficient, when applied to a sample, can be represented by r, and can be referred to as a sample correlation coefficient. Equation (2) is obtained by substituting estimates of the co-variants and variants based on a sample into Equation (1) above. Using this approach, the correlation matrix data structure of FIG. 7B can be determined for the trace fields.

$$r = \frac{\sum_{i=1}^{n}(X_i - \overline{X})(Y_i - \overline{Y})}{\sqrt{\sum_{i=1}^{n}(X_i - \overline{X})^2} \sqrt{\sum_{i=1}^{n}(Y_i - Y)^2}} \quad (2)$$

where:
r=sample correlation coefficient;
n=the paired data sample size;
$X_i$=individual sample points indexed with i;
$Y_i$=individual sample points indexed with i;
$\overline{X}$=the sample mean; and
$\overline{Y}$=the sample mean.

Figure 4D:
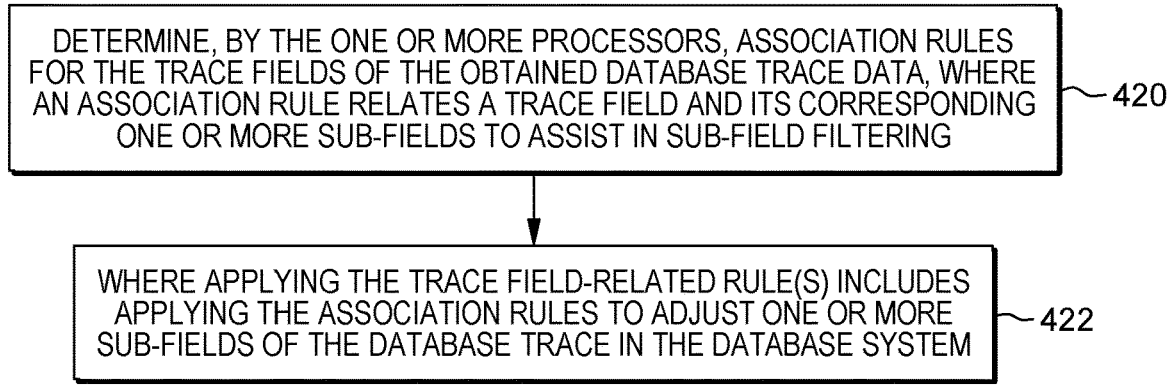

FIG. 4D depicts one embodiment of data-analysis-based facility processing to learn one or more association rules between trace fields and respective sub-fields. As illustrated, program code determines association rules for the trace fields of the obtained database trace data, where an association rule relates a trace field and its corresponding one or more sub-fields to assist in sub-field filtering 420. Once obtained, applying the trace field-related rules includes applying the association rules to adjust one or more sub-fields of the database trace in the database system 422. One embodiment of this process is depicted in FIG. 8A.

In general, association rules are used to depict, for instance, if event A happens, what is the probability of event B happening. Here, event A could be considered as the value of a sub-field exceeding its normal value by 0-25%, 25%-50%, 50%-75%, or 75%-100%, and event B could be considered as the value of the parent field being abnormal. In FIG. 8A, the upper table includes historical data, where a value in a column being 0 means that the parent field value is normal, while a 1 means that the field value is abnormal. For instance, consider the fourth row in the data structure of FIG. 8A. The illustrated data means that the SUB-FIELD #1-1 value exceeds the normal value by 50%-75%, with the parent field value being abnormal. Then, with the above historical data structure, association rules can be determined by, for instance, machine learning, to generate correlation rules, such as depicted in the lower right data structure of FIG. 8A. For example, when the value of SUB-FIELD #1-1 exceeds its normal value by 50%-75%, the probability of the event B (parent field value being abnormal) is 87%, while when the value of SUB-FIELD #1-1 exceeds its normal value by only 0-25%, the probability of the event B (parent field being abnormal) is 15%. One or more rules can thus be generated, such as when the parent field is abnormal, if the value of SUB-FIELD #1-1 exceeds its normal value by 50%-75%, then keep and/or retain the SUB-FIELD #1-1 in the database trace. However, if the value of SUB-FIELD #1-1 exceeds its normal value by only 0-25%, then prune or eliminate this sub-field from the database trace. In one embodiment, equations such as Equations (3) & (4) below can be utilized by the data-analysis-based facility for discovering interesting relations between fields and sub-fields in the obtained database trace data. The processing is designed to identify strong rules discovered in the database data, which allows for further tailoring of the database trace to, for instance, reduce impact on system performance of database tracing in the database system.

$$\text{Support}(X \rightarrow Y) = P(X,Y)/P(I) = P(X \cup Y)/P(I) = \text{num}(X \cup Y)/\text{num}(I) \quad (3)$$

$$\text{Confidence}(X \rightarrow Y) = P(Y/X) = P(X,Y)/P(X) = P(X \cup Y)/P(X) \quad (4)$$

where:
I=Itemset;
X=antecedent or left-hand-side (LHS);
Y=consequent or right-hand-side (RHS); and
P=probability.

In one or more embodiments, machine learning can be utilized to perform cognitive analysis of the database trace data to facilitate determining association rules such as described herein. Machine learning (ML) solves problems that cannot be solved by numerical means alone. In an ML-based example, program code extracts various features/attributes from obtained data (e.g., data collected from prior database traces) which can be stored in one or more places, including within the database system. The features can be utilized to develop a predictor function, also referred to as a hypothesis, which the program code utilizes to train a machine learning model.

In training or predicting for deriving association rules, prior database trace data is analyzed by the system. The program code can utilize various techniques to select features (elements, patterns, attributes, etc.) including, but not limited to, diffusion mapping, principal component analysis, recursive feature elimination (a brute force approach to selecting features), and/or a random forest, to predict or determine association rules between fields and sub-fields based on respective values. The program code can utilize a machine learning algorithm to train the machine learning model (the algorithms utilized by the program code), including providing rankings or weights for extracted data for inclusion, so that the program code can train the predictor or rules generator. The conclusions can be evaluated by a quality metric. By selecting an appropriate set of training data, the program code trains the machine learning model to identify and weight various attributes (e.g., features, patterns) that correlate (for example) normal and abnormal field values with different sub-field values.

Figure 8B:
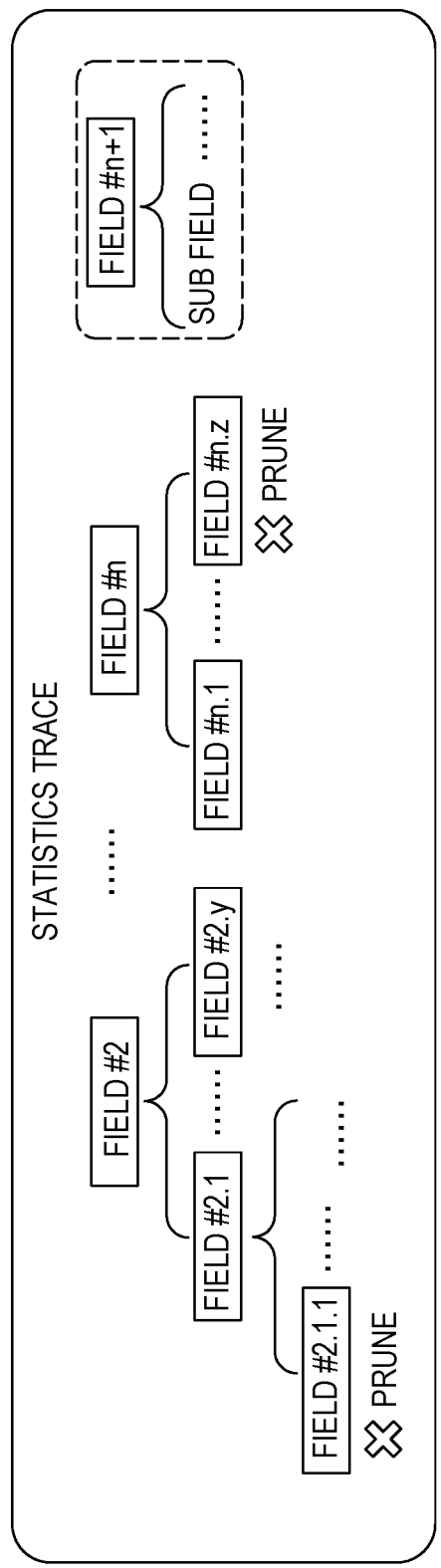
FIG. 8B depicts one embodiment of the statistics trace where one or more sub-fields are eliminated, and one or more sub-fields are added, based on one or more determined association rules, such as the determined association rules of FIG. 8A, in accordance with one or more aspects of the present invention.

FIG. 8B depicts an example of this processing, where the statistics trace of FIG. 7C has sub-fields added for the primary fields (FIELD #2, FIELD #n, FIELD #n+1), with certain sub-fields (SUB-FIELD #2.1.1 and SUB-FIELD #n.z) being pruned or eliminated from the database trace for future database tracing.

As noted, the data-analysis-based facility disclosed herein can use, in one or more aspects, machine learning. In one embodiment, each database trace classification can be obtained by default, where the default trace is of coarse granularity and frequency. The data analysis employed by the facility can include obtaining training/testing data for a machine learning model to train/test the machine learning model. Basic classification and association can be used to combine the trace and exact diagnostic steps and expected trace level (e.g., type and ID). Further, a cross-type association can be determined from different trace information for each error or issue generated to obtain typical suites of trace combination models, including but not limited to trace type, trace level and class, specification trace keywords and parameters input, trace information and other system responses, diagnostic steps and corresponding log, etc. Furthermore, with the trace combination model and trace data, a suggested corresponding diagnostic step and/or root cause location can be provided. Regarding an association rule, FP-growth can be used, where mining frequency items across different trace types can be used. Association to different trace information can include but not be limited to trace type, trace level and class, specification trace keywords and parameter input, trace information and other system response, diagnostic steps and corresponding log. A divide and conquer approach can be adopted for each core issue or error message, iteratively building a conditional FP tree, deleting infrequent items by update of the support count. Within each tree, item sets can be pruned based on the support with trace-level ID. Advantageously, the facility disclosed herein enhances database tracing by making the database tracing more efficient. Further, automatic modification of tracing is provided by optimizing granularities within corresponding fields.

Figure 9:
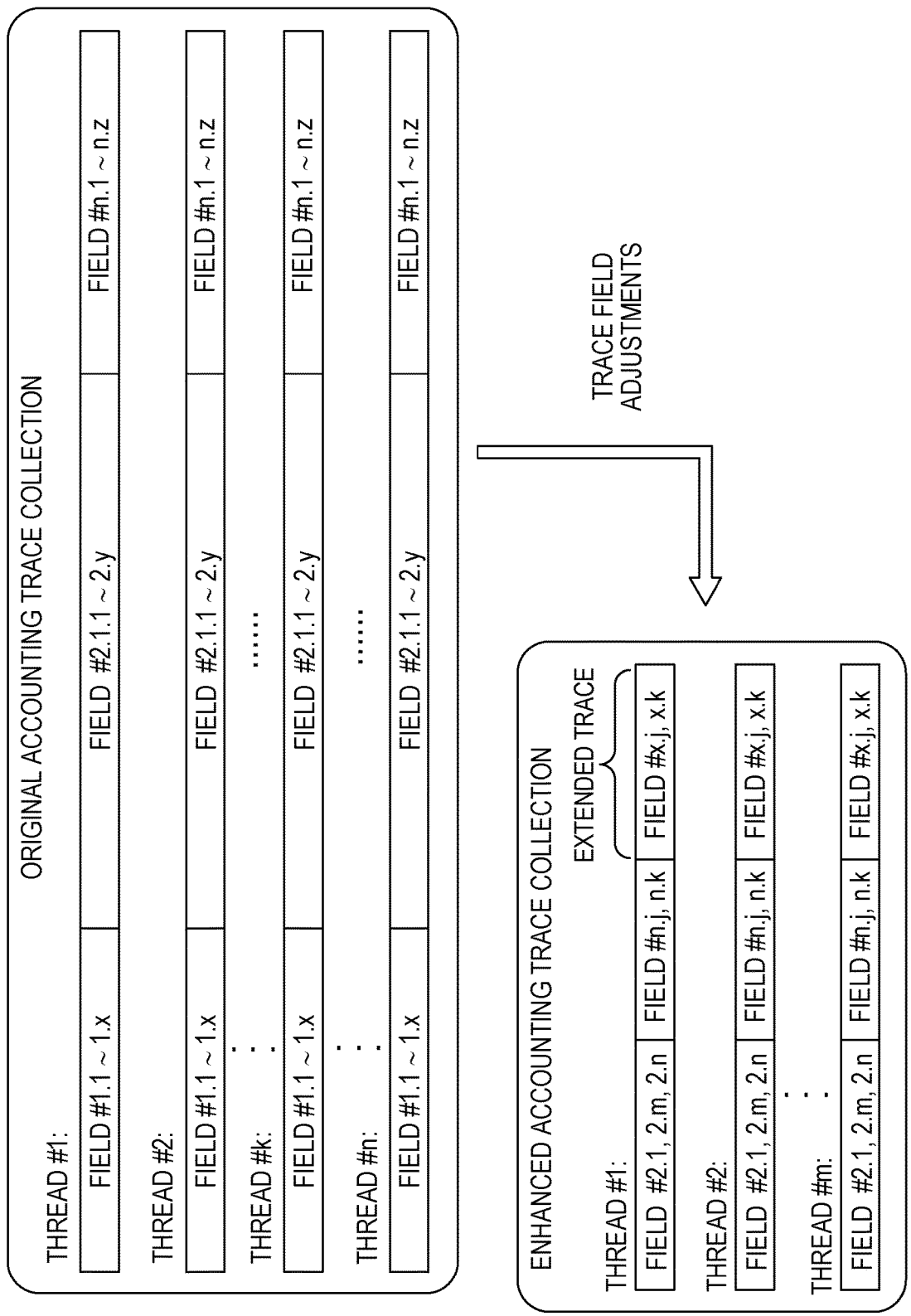
FIG. 9 illustrates one embodiment of accounting trace-level data collection using a conventional database trace approach, and accounting trace-level data collection using a database trace approach qualified by a data-analysis-based facility, in accordance with one or more aspects of the present invention.

FIG. 9 illustrates an advantage to the data-analysis-based facility adjusting of trace fields such as disclosed herein. In the upper portion of FIG. 9, the obtained database trace data is illustrated using a typical (or original) accounting trace collection process. As illustrated, with an enhanced accounting trace collection process as disclosed herein, significantly less trace data is obtained, thereby reducing impact on system performance of the database tracing in the database system, as well as reducing impact on storage within the database system of the database trace data. Further, in addition to reducing the amount of collected trace data, the retained trace data is more likely to contain helpful information, which facilitates identifying and addressing one or more database system issues.

Figure 10:
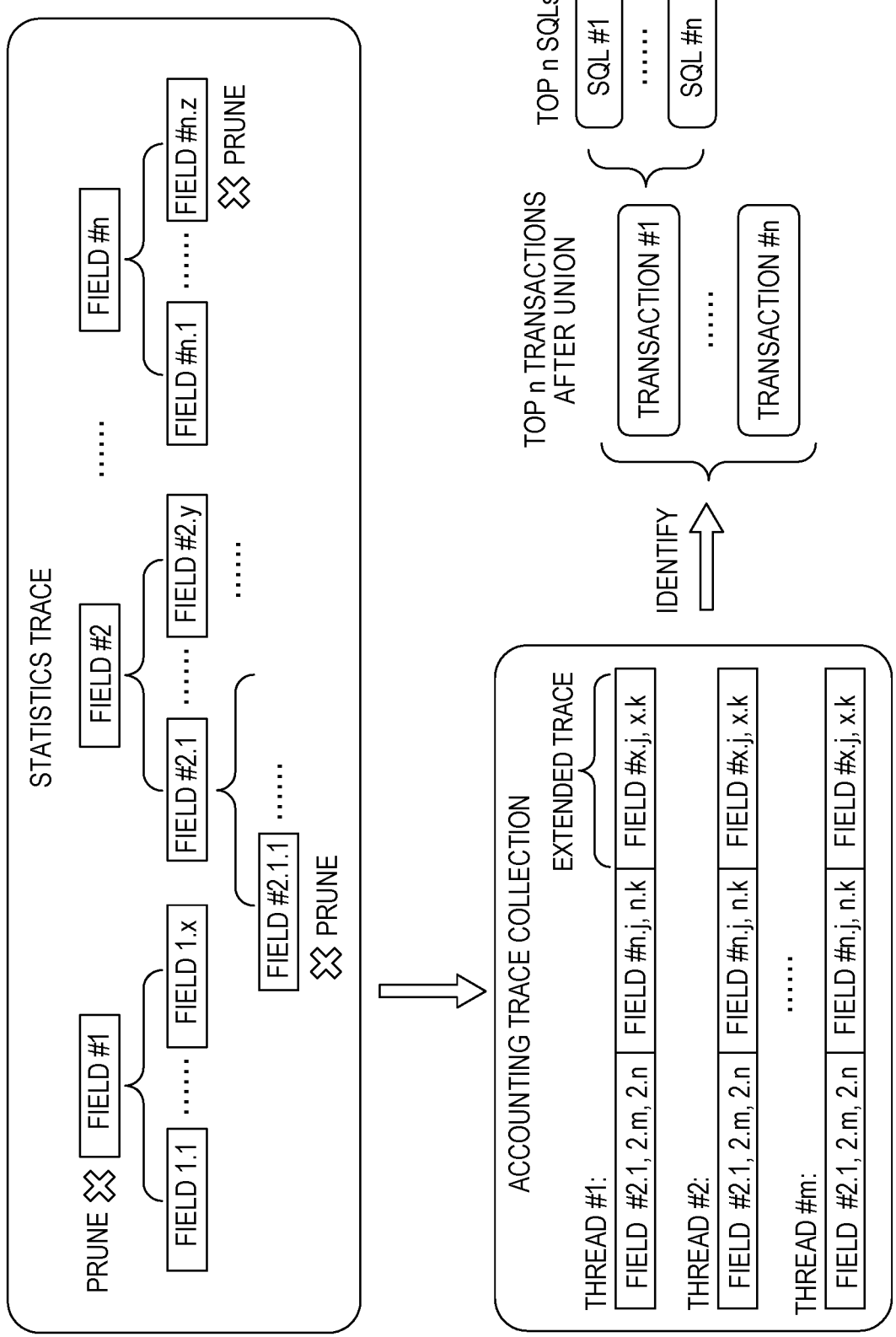
FIG. 10 is an overview embodiment of dynamic database trace processing, in accordance with one or more aspects of the present invention.

FIG. 10 depicts one embodiment of database tracking with a database trace tool utilizing data-analysis-based facility processing, in accordance with one or more aspects of the present invention. As illustrated in FIG. 10, a statistics trace is dynamically adjusted based on obtained database trace data. In particular, the obtained database trace data is collected from database tracing, at least in part, a database system, and is analyzed by the program code to determine one or more trace field-related rules to, in part, reduce impact on system performance of database tracing in the database system. As a result of this processing, multiple fields and sub-fields are pruned or eliminated, as illustrated, resulting in a more condensed accounting trace data collection for each thread of the multi-threaded computing environment. As illustrated in FIG. 10, one or more trace fields and/or sub-fields can also be added, resulting in an extended trace, where the data-analysis-based processing identifies, for instance, one or more trace fields with abnormal values than are currently not part of the database trace being collected. Based on adjusting the trace fields of the database trace, the database trace data can be collected and sorted to (for instance) identify possible transactions, such as the top n transactions (and optionally their associated SQLs) potentially related to a database performance issue. As explained, in one embodiment, different transactions execute on different threads, and the identifying can be, for instance, identifying the top n transactions taking the longest to complete, with time correlating (in one embodiment) to a potential processing issue within the database system.

Although various components are described, aspects of the invention can be performed by one or more of the components. There can be additional, fewer and/or different components used to perform one or more aspects of the present invention. Many variations are possible.

Further other types of computing environments can also incorporate and use one or more aspects of the present invention, including, but not limited to, emulation environments. In one example, a computing environment includes, for instance, a native central processing unit (CPU), a memory, and one or more input/output devices and/or interfaces coupled to one another via, for example, one or more buses and/or other connections.

The native central processing unit includes one or more native registers, such as one or more general purpose registers and/or one or more special purpose registers used during processing within the environment. These registers include information that represents the state of the environment at any particular point in time.

Moreover, the native central processing unit executes instructions and code that are stored in memory. In one particular example, the central processing unit executes emulator code stored in memory. This code enables the computing environment configured in one architecture to emulate another architecture. For instance, the emulator code allows machines based on architectures other than, for instance, the z/Architecture® hardware architecture offered by International Business Machines Corporation, such as PowerPC processors, HP Superdome servers or others, to emulate, for instance, the z/Architecture® hardware architecture and to execute software and instructions developed based on, for instance, the z/Architecture® hardware architecture. z/Architecture® is a trademark or registered trademark of International Business Machines Corporation in one or more jurisdictions.

Further details relating to the emulator code can include guest instructions being stored in memory, including software instructions (e.g., correlating to machine instructions) that were developed to be executed in an architecture other than that of the native CPU. For example, the guest instructions can be designed to execute on a processor based on the z/Architecture® hardware architecture, but instead, are being emulated on a native CPU. In one example, the emulator code includes an instruction fetching routine to obtain one or more guest instructions from memory, and to optionally provide local buffering for the instructions obtained. It also includes an instruction translation routine to determine the type of guest instruction that has been obtained and to translate the guest instruction into one or more corresponding native instructions. This translation includes, for instance, identifying the function to be performed by the guest instruction and choosing the native instruction(s) to perform that function.

Further, the emulator code can include an emulation control routine to cause the native instructions to be executed. The emulation control routine can cause the native CPU to execute a routine of native instructions that emulate one or more previously obtained guest instructions and, at the conclusion of such execution, return control to the instruction fetch routine to emulate the obtaining of the next guest instruction or a group of guest instructions. Execution of the native instructions can include loading data into a register from memory; storing data back to memory from a register; or performing some type of arithmetic or logic operation, as determined by the translation routine.

Each routine is, for instance, implemented in software, which is stored in memory and executed by the native central processing unit. In other examples, one or more of the routines or operations are implemented in firmware, hardware, software or some combination thereof. The registers of the emulated processor can be emulated using registers of the native CPU or by using locations in memory. In one or more embodiments, the guest instructions, the native instructions, and the emulator code can reside in the same memory or can be disbursed among different memory devices.

In addition, one or more aspects can relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
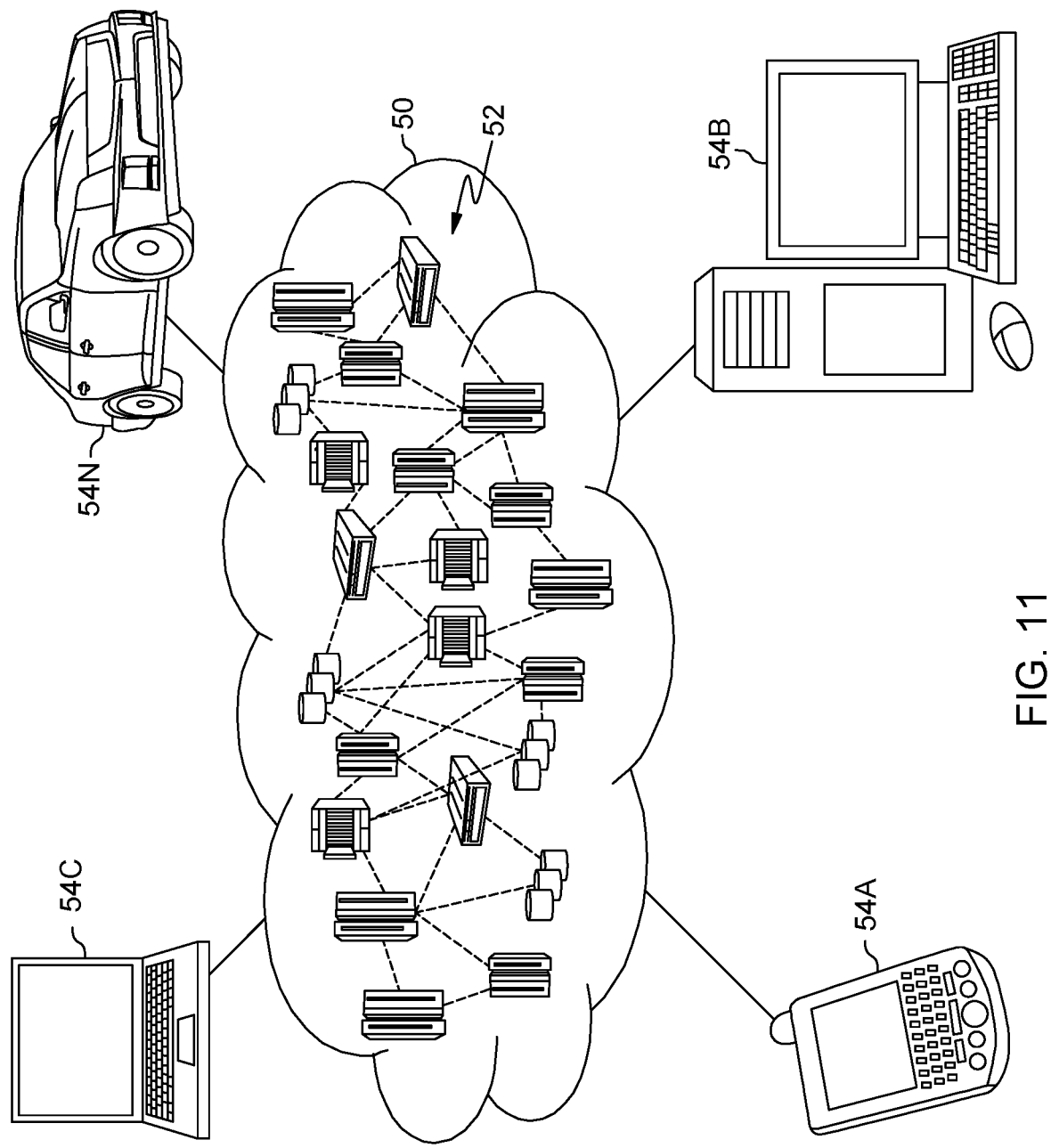
FIG. 11 depicts an embodiment of a cloud computing environment which can facilitate implementing, or be used in association with, certain aspects of an embodiment of the present invention.

Referring now to FIG. 11, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 52 and cloud computing environment 50 can communicate with any type of computerized device over any type of network and/or network addressable connection (e.g., using a web browser).

Figure 12:
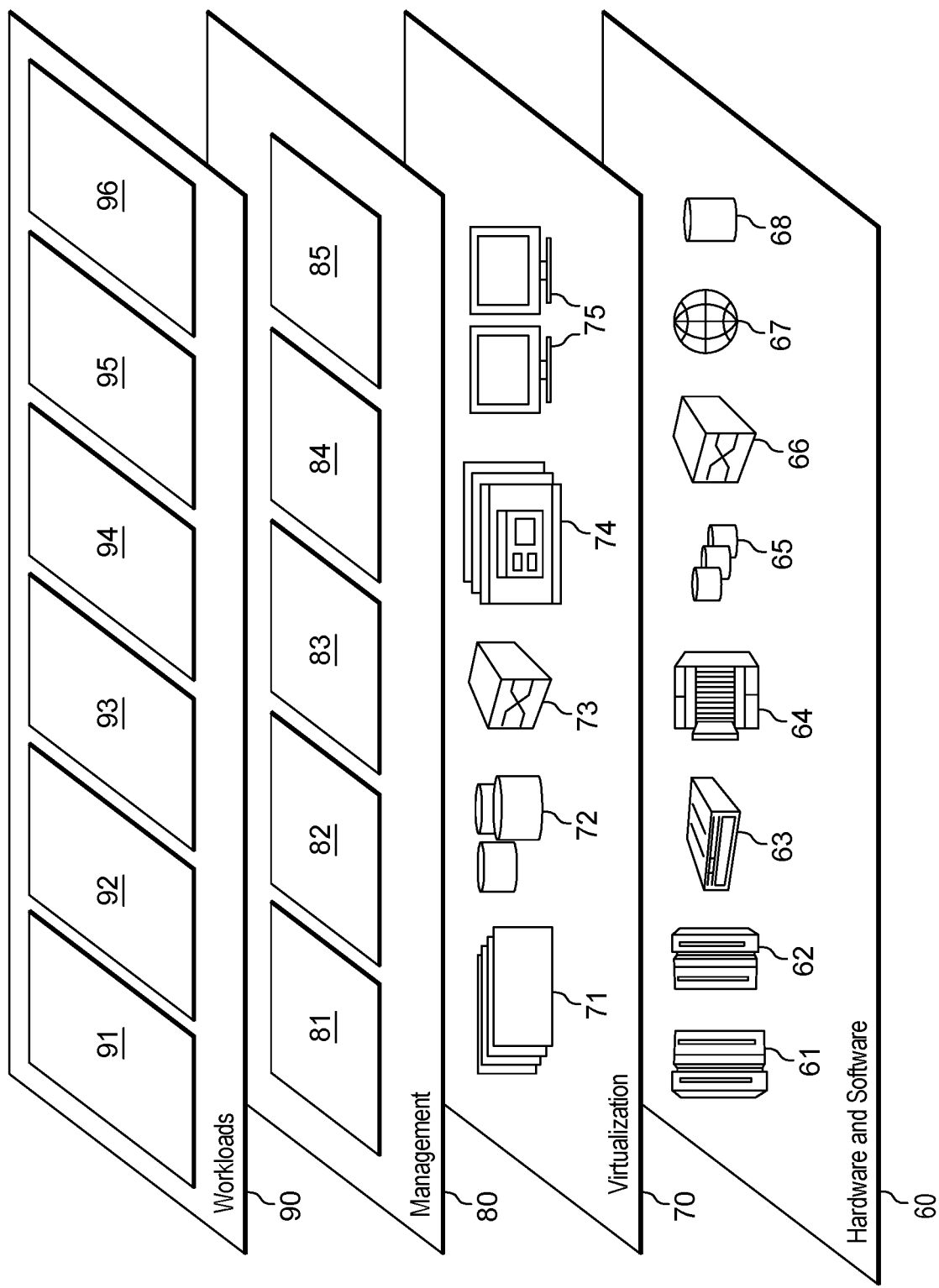
FIG. 12 depicts abstraction model layers, in accordance with one or more aspects of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database-related processing 96.

The computing environments described above are only examples of computing environments that can be used. Other environments, including but not limited to, non-partitioned environments, partitioned environments, cloud environments and/or emulated environments, can be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for database-related processing, in accordance with one or more aspects of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, splitting and/or merging may be performed based on other criteria and/or differently than described herein. Further, other soring techniques may be used. Additionally, the deploying of additional write log engines may be based on other criteria. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer-readable storage media and program instructions collectively stored on the one or more computer-readable storage media, the program instructions being executable by one or more processors to cause the one or more processors to perform a method comprising:
   obtaining database trace data collected from database tracing, at least in part, a database system of the computing environment, the database tracing being for a level of database tracing of multiple levels of database tracing, and the level of database tracing comprising a trace hierarchy of trace fields used in the database tracing;
   data analyzing, by the one or more processors, the database trace data, and determining therefrom one or more field-related rules to, in part, reduce impact on system performance of database tracing in the database system; and
   applying, by the one or more processors, the one or more field-related rules to adjust for the level of database tracing the trace hierarchy of trace fields for a database trace in the database system to adjust trace fields of the database trace according to the one or more field-related rules, thereby reducing impact on system performance of the database trace in the database system.

2. The computer program product of claim 1, wherein adjusting the trace hierarchy pursuant to the one or more field-related rules comprises eliminating one or more trace fields of the database trace in the database system with normal trace data values based on the one or more field-related rules.

3. The computer program product of claim 1, wherein adjusting the trace hierarchy pursuant to the one or more field-related rules comprises adding one or more trace fields to the database trace in the database system with abnormal trace data values based on the one or more field-related rules.

4. The computer program product of claim 1, further comprising generating performance threshold curves against trace fields defined in the obtained database trace data, and based, at least in part, on the performance threshold curves, determining at least one field-related rule of the one or more field-related rules.

5. The computer program product of claim 4, wherein the determining comprises determining respective normal distribution ranges for the trace fields from the generated performance threshold curves, and determining the at least one field-related rule is relative to the determined, respective normal distribution ranges.

6. The computer program product of claim 1, wherein the determining further comprises determining correlation dependencies between trace fields of the obtained database trace data, and based, at least in part, on the correlation dependencies between trace fields, determining at least one field-related rule of the one or more field-related rules.

7. The computer program product of claim 6, wherein adjusting the trace hierarchy pursuant to the one or more field-related rules comprises eliminating, by the one or more processors, one or more trace fields of the database trace in the database system based on the determined correlation dependencies between trace fields of the obtained database trace data.

8. The computer program product of claim 6, wherein the determining further comprises determining at least one association rule between a trace field of the obtained database trace data, and one or more sub-fields of that trace field, the at least one association rule being at least one field-related rule of the one or more field-related rules.

9. The computer program product of claim 8, wherein adjusting the trace hierarchy pursuant to the one or more field-related rules comprises at least one of eliminating at least one trace field or trace sub-field of the database trace or adding at least one trace field or trace sub-field to the database trace in the database system based on the determined at least one association rule.

10. The computer program product of claim 1, further comprising sorting, by the one or more processors, collected trace data collected from the database trace in the database system, the sorting being to locate one or more transactions and associated structure query languages (SQLs) potentially causing a database system performance issue.

11. A computer system for facilitating trace processing in a database system, the computer system comprising:
   a memory;
   one or more processors in communication with the memory; and
   program code executable by the one or more processors via the memory to perform a method comprising:
      obtaining database trace data collected from database tracing, at least in part, a database system of the computing environment, the database tracing being for a level of database tracing of multiple levels of database tracing, and the level of database tracing comprising a trace hierarchy of trace fields used in the database tracing;
      data analyzing, by the one or more processors, the database trace data, and determining therefrom one or more field-related rules to, in part, reduce impact on system performance of database tracing in the database system; and
      applying, by the one or more processors, the one or more field-related rules to adjust for the level of database tracing the trace hierarchy of trace fields for a database trace in the database system to adjust trace fields of the database trace according to the one or more field-related rules, thereby reducing impact on system performance of the database trace in the database system.

12. The computer system of claim 11, further comprising generating performance threshold curves against trace fields defined in the obtained database trace data, and based, at least in part, on the performance threshold curves, determining at least one field-related rule of the one or more field-related rules.

13. The computer system of claim 12, wherein the determining comprises determining respective normal distribution ranges for the trace fields from the generated performance threshold curves, and determining the at least one field-related rule is relative to the determined, respective normal distribution ranges.

14. The computer system of claim 11, wherein the determining further comprises determining correlation dependencies between trace fields of the obtained database trace data, and based, at least in part, on the correlation dependencies between trace fields, determining at least one field-related rule of the one or more field-related rules.

15. The computer system of claim 14, wherein adjusting the trace hierarchy pursuant to the one or more field-related rules comprises eliminating, by the one or more processors, one or more trace fields of the database trace in the database system based on the determined correlation dependencies between trace fields of the obtained database trace data.

16. The computer system of claim 14, wherein the determining further comprises determining at least one association rule between a trace field of the obtained database trace data, and one or more sub-fields of that trace field, the at least one association rule being at least one field-related rule of the one or more field-related rules, and wherein adjusting the trace hierarchy pursuant to the one or more field-related rules comprises at least one of eliminating at least one trace field or trace sub-field of the database trace or adding at least one trace field or trace sub-field to the database trace in the database system based on the determined at least one association rule.

17. A computer-implemented method for facilitating trace processing in a database system, the computer-implemented method comprising:
   obtaining database trace data collected from database tracing, at least in part, a database system of the computing environment, the database tracing being for a level of database tracing of multiple levels of database tracing, and the level of database tracing comprising a trace hierarchy of trace fields used in the database tracing;
   data analyzing, by the one or more processors, the database trace data, and determining therefrom one or more field-related rules to, in part, reduce impact on system performance of database tracing in the database system; and
   applying, by the one or more processors, the one or more field-related rules to adjust for the level of database tracing the trace hierarchy of trace fields for a database trace in the database system to adjust trace fields of the database trace according to the one or more field-related rules, thereby reducing impact on system performance of the database trace in the database system.

18. The computer-implemented method of claim 17, further comprising generating performance threshold curves against the trace fields defined in the obtained database trace data, and based, at least in part, on the performance threshold curves, determining at least one field-related rule of the one or more field-related rules.

19. The computer-implemented method of claim 17, wherein the determining further comprises determining correlation dependencies between trace fields of the obtained database trace data, and based, at least in part, on the correlation dependencies between trace fields, determining at least one field-related rule of the one or more field-related rules.

20. The computer-implemented method of claim 19, wherein the determining further comprises determining at least one association rule between a trace field of the obtained database trace data, and one or more sub-fields of that trace field, the at least one association rule being at least one field-related rule of the one or more field-related rules, and wherein adjusting the trace hierarchy pursuant to the one or more field-related rules comprises at least one of eliminating at least one trace field or trace sub-field of the database trace or adding at least one trace field or trace sub-field to the database trace in the database system based on the determined at least one association rule.

* * * * *